(12) United States Patent
Bergman

(10) Patent No.: US 6,512,208 B1
(45) Date of Patent: Jan. 28, 2003

(54) DEVICE IN A PRESSURE VESSEL FOR HOT ISOSTATIC PRESSING

(75) Inventor: Carl Bergman, Surahammar (SE)

(73) Assignee: Flow Holdings GmbH (SAGL) Limited Liability Company (CH)

( * ) Notice: Subject to any disclaimer, the term of this patent is extended or adjusted under 35 U.S.C. 154(b) by 0 days.

(21) Appl. No.: 09/423,922

(22) PCT Filed: May 15, 1998

(86) PCT No.: PCT/SE98/00903
§ 371 (c)(1),
(2), (4) Date: Jul. 10, 2001

(87) PCT Pub. No.: WO98/51434
PCT Pub. Date: Nov. 19, 1998

(30) Foreign Application Priority Data

May 16, 1997 (SE) .............................. 9701852

(51) Int. Cl.[7] .............................. B01J 3/04; B22F 3/15; B29C 43/10; F27B 5/04; F27B 5/16
(52) U.S. Cl. ......................... 219/400; 425/78
(58) Field of Search .................. 219/400; 126/21 R; 34/220, 234; 425/78

(56) References Cited

U.S. PATENT DOCUMENTS

| | | | |
|---|---|---|---|
| 1,435,094 A | * 11/1922 | Warren et al. ................. 34/220 |
| 4,217,087 A | 8/1980 | Bowles ......................... 425/78 |
| 4,235,592 A | * 11/1980 | Smith, Jr. et al. ........... 219/400 |
| 4,509,729 A | * 4/1985 | Inoue ........................... 425/78 |
| 5,123,832 A | * 6/1992 | Bergman et al. ............ 219/400 |
| 5,366,563 A | 11/1994 | McKenzie .................. 148/216 |
| 5,366,689 A | 11/1994 | Säiner ........................... 419/49 |

FOREIGN PATENT DOCUMENTS

| | | |
|---|---|---|
| DE | 27 49 614 A1 | 5/1979 |
| EP | 0 395 884 A1 | 11/1990 |
| WO | WO 97/20652 | 6/1997 |
| WO | WO 98/56525 | 12/1998 |

* cited by examiner

Primary Examiner—Joseph Pelham
(74) Attorney, Agent, or Firm—Seed Intellectual Property Law Group PLLC

(57) ABSTRACT

A device in a pressure vessel for hot isostatic pressing utilizing a furnace chamber (3) surrounded by a heat insulating member (4), a carrier (5) arranged in the furnace chamber and adapted for carrying loads (6) and which has lateral walls (8) with a space with respect to said member. An arrangement (12) for heating gases present in the furnace chamber is arranged in the bottom region (11) of the chamber and the lateral walls of the carrier are provided with layers (17) having a high heat insulating capacity.

10 Claims, 1 Drawing Sheet

DEVICE IN A PRESSURE VESSEL FOR HOT ISOSTATIC PRESSING

BACKGROUND OF THE INVENTION

1. Field of the Invention

Figure 1:
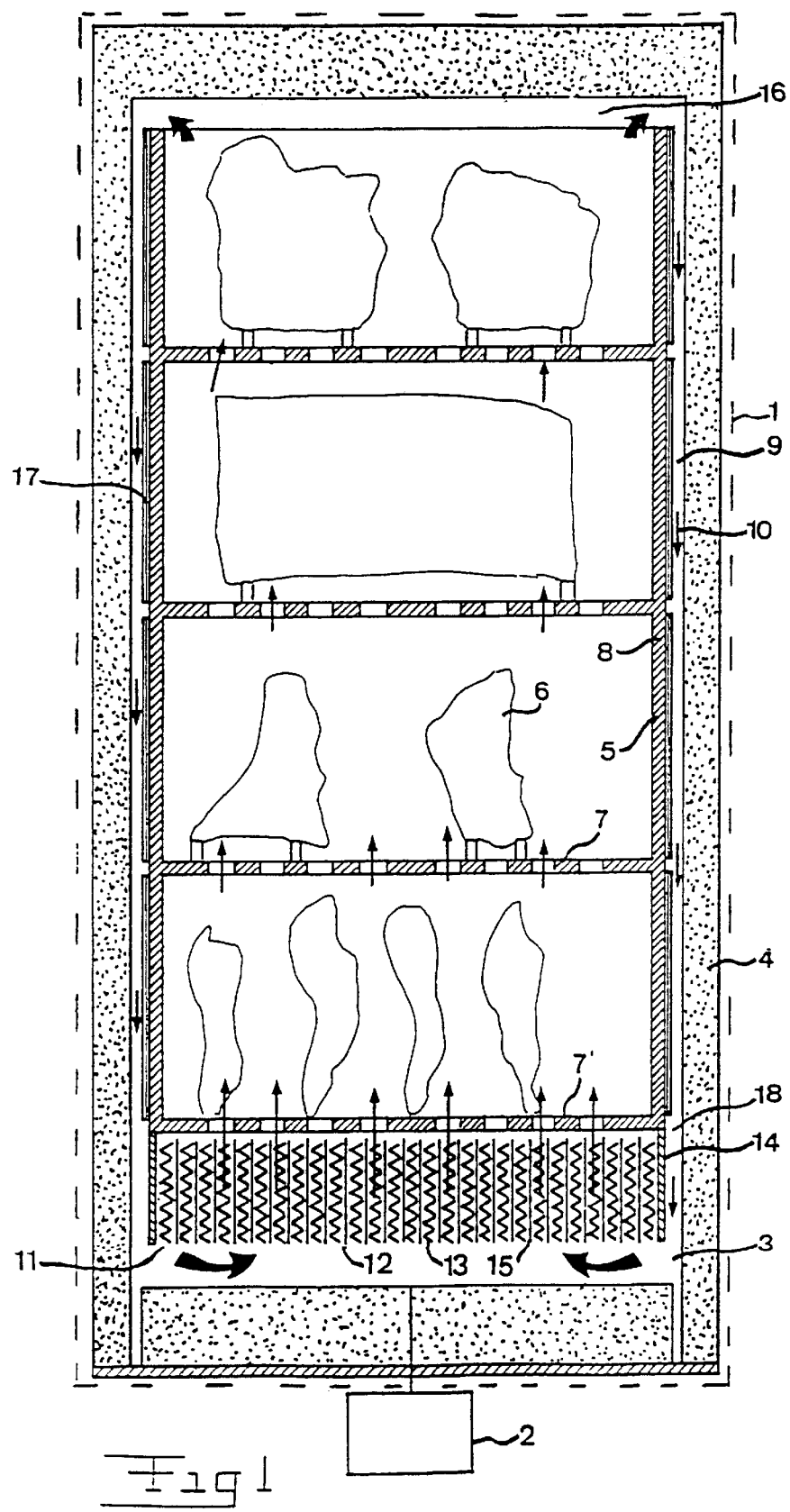

The present invention relates to a device in a pressure vessel for hot isostatic pressing comprising a furnace chamber surrounded by a heat insulating member. A load carrier arranged in the furnace chamber contains one or more shelf planes perforated for gas flow therethrough and adapted to carry loads to be pressed. The chamber is provided with heating elements for heating the gas present in the chamber. The load carrier, having surrounding lateral walls, is arranged with a space between the load carrier and the insulating member to allow the flow of gas therebetween from the top and downwardly around the carrier.

2. Description of the Related Art

Hot isostatic pressing (HIP) is a technique being used more often. The HIP technique is used to achieve a pressing out of so-called "shrinkages" in castings through the combination of heat and high gas pressures in the furnace chamber. For example, substantial increases have been achieved in the strength and life of cast turbine blades for aircraft, produced with the HIP process. The HIP process is also used for manufacturing products of compact material to remove porosity by compressing and heating the material, for example, a powder.

Typical pressures in hot isostatic pressing are 500–5,000 bars, in which the temperature usually varies between 500 and 2,200° C. A temperature is normally selected to be approximately 75% of the fusion temperature of the material in question, and the pressure medium is usually an inert gas such as argon.

A device, as described above, is the subject of U.S. Pat. No. 4,212,087 issued to Bowles. The heating elements in the Bowles device are placed in the furnace chamber in the vertical direction along the load carrier so as to ensure that the temperature differences between different parts of the furnace chamber are as low as possible. Consequently, the loads present anywhere within the furnace chamber get substantially the same treatment with the same result. The manufacturing of the insulating member gets comparatively complicated because of the arrangement of the sensitive heating elements. Furthermore, the heating elements must be carefully regulated to obtain a desired temperature profile in the furnace chamber.

BRIEF SUMMARY OF THE INVENTION

The object of the present invention is to provide a device in which the disadvantages of the Bowles device, particularly the complicated arrangement of the heating elements, are overcome. Additionally, the object of the present invention is to make a device that is easier to manufacture and less costly without any diminution in reliability of the hot isostatically pressed product.

In one embodiment, the objects of the invention are obtained by the fact that at least the heating elements producing the main part of the heating of the heating arrangement are arranged in the bottom region of the chamber, and at least considerable portions of said lateral walls of the carrier are provided with layers having a good heat insulating capacity.

The temperature difference between the inner side of the lateral walls and the space between the outside thereof and the insulating member will be increased by the provision of said lateral walls with layers having a good heat insulating capacity, so that a very good driving force for a self convection of said gases will be obtained.

The temperature in the furnace chamber will be balanced in the vertical direction by self-convection, since the gases heated when passing the heating elements in the bottom region will rise in the furnace chamber, and the driving force for this rising movement is dependant upon the temperature difference between the space inside the lateral walls of the load carrier and the space between said lateral walls and the insulating member. A reduction of the temperature differences within the load carrier is obtained by this increased driving force for self convection. The temperature balance is also improved by decreasing the heat loss through the lateral walls of the load carrier by good insulation of the lateral walls. Thus, the temperature differences between different parts within the space of the very load carrier may be kept at an acceptable low level.

Another advantage of the heating elements being located in the bottom region of the chamber is that this arrangement allows the insulating members to be produced in a more simple way without any sensitive heating elements on the inner side thereof. Furthermore, it is easy to generate the heat required in the bottom region of a furnace chamber. Material being too fragile for being able to be drawn upwardly along the walls and be used as heating elements, because it could be broken, may now be used as heating elements in an arrangement thereof in the bottom region, so that more cost efficient material may be used for the heating.

According to a preferred embodiment of the invention, all the heating elements of the heating arrangement are arranged in the bottom region of the chamber. This arrangement makes building the device simple and cost effective. Additionally, reliability is maintained with respect to the function of the device.

According to another preferred embodiment of the invention said layers having a good heat insulating capacity extend over substantially the entire lateral walls of the carriers. An increased temperature difference between the interior and exterior lateral walls of the load carrier results in an increased driving force to produce self-convection or natural convection. Consequently, because less heat is lost through the lateral walls upwardly in the load carrier, the temperature balancing in the vertical direction of the load carrier is increased.

According to another embodiment of the invention, the layers having a good heat insulating capacity are arranged externally of and on lateral walls belonging to a framework of the load carrier. Load carriers already existing without any such heat insulating layers may be modified to have such an arrangement of the heat insulating layer by application thereof on said lateral walls.

According to another embodiment of the invention, the lower portion of the load carrier lateral walls are arranged to extend substantially past and surround the heating elements arranged in the bottom region of the furnace chamber, for conducting gases flowing downwardly in said space from below and upwardly past the heating elements for heating thereof. Such a design of the lateral walls and a localization of the heating elements result in a very good heat transfer between the heating elements and the gases flowing inside the furnace chamber.

According to another embodiment of the invention, the heating arrangement has thin plates placed in the bottom region of the chamber. The plates are concentrically inside each other with mutual spaces therebetween with a center axis directed upwardly and arranged to carry heating elements within the mutual spaces, so that gas is allowed to flow between the plates past the heating elements. An arrangement of such concentric plates for carrying the heating elements and guiding the gases past the heating elements, means that an efficient transfer of heat from the heating elements to the gas may take place while ensuring a good gas flow through the heating arrangement and upwardly through the load carrier.

BRIEF DESCRIPTION OF THE SEVERAL VIEWS OF THE DRAWINGS(S)

FIG. 1 is a section-view illustrating a device according to a preferred embodiment of the invention in a pressure vessel for hot isostatic pressing.

DETAILED DESCRIPTION OF THE INVENTION

The construction of a device in a pressure vessel for hot isostatic pressing according to a preferred embodiment of the invention is schematically illustrated in FIG. 1. The walls of a pressure vessel 1, which usually include a powerful reinforcement by many windings of music wires for resisting the high pressures generated inside the vessel, are indicated by the dashed lines since the construction of such vessels are well known. Furthermore, a compressor 2 is schematically indicated through a box and is adapted to pump a gas, preferably an inert gas such as argon, into a furnace chamber 3 while compressing it so as to obtain a very high gas pressure, e.g. in the order of 500–5,000 bars, in the furnace chamber. The device has a heat insulating member or envelope 4, which surrounds the furnace chamber 3 and is arranged for keeping the heat dissipation to the surrounding pressure vessel wall 1 low.

A carrier 5 for loads/charges 6 to be heated and pressed, a so-called load basket, is arranged in the furnace chamber 3. The load basket has a number of superimposed shelf planes 7, which are perforated for allowing a good gas flow therethrough, and the total hole surface is e.g. about 30% of the total area of the respective shelf. By arranging a plurality of such shelf planes in the load carrier, a higher number of loads may be treated simultaneously, but this.

However, a greater number of shelves 7 means a higher risk of treating the loads in different ways, for example, they may be treated with different temperatures depending upon their relative locations within the load carrier. The device of the present invention avoids the non-uniform heating risk because the load carrier 5 has surrounding lateral walls 8, arranged so that a space 9 is formed between the load carrier 5 and the insulating member 4. This arrangement of the present invention allows the free flow of gas, indicated by the arrows 10, therebetween from the top of the furnace chamber, downwardly around the load carrier, and back up through the heating arrangement 12.

The shape of the insulating member and the load basket is usually cylindrical because the outer walls of the pressure vessel are preferably cylindrical for resisting the high pressures generated inside the vessel.

A heating arrangement 12 with heating elements 13 is arranged in the bottom region 11 of the furnace chamber for heating gas present in the chamber. The heating arrangement is arranged under the lowermost shelf plane 7' of the load carrier 5 and internally of the extended lateral walls 14, which extend substantially past the heating arrangement for conducting gases flowing in the space 9 downwardly from below and upwardly past the heating elements 13 for heating thereof.

The heating arrangement has thin plates 15 placed inside each other with mutual spaces and with a center axis directed upwardly, and these plates are adapted to carry heating elements 13 arranged thereon in the spaces therebetween, so that gas is allowed to flow between said plates past the heating elements. The number of plates is in practice substantially higher and they are arranged substantially closer to each other than shown in the figure, which is only used for explaining the ideas of the invention.

The arrangement of a so-called bottom heater 12 in the furnace chamber causes the gases heated by the heating elements 13 to flow upwardly through the furnace chamber by self-convection resulting in a balanced, uniform temperature throughout the chamber interior. Upon reaching the upper end 16 of the furnace chamber, the gas flows back in a downward direction through the space 9 at the outer side of the load carrier 5 to the bottom region 11 of the furnace chamber for reheating there.

Layers 17 with a good heat insulating capacity are arranged on the outside of the lateral walls 8. These layers may e.g. be formed by ceramic fibers. A reduced heat transfer through the lateral walls of the load basket to the space 9 is obtained through the layers, so that the temperature difference between the interior of the load basket and the exterior thereof will be larger than without the insulating layers. The greater the insulation capacity of the layers, the larger the temperature difference between the load carrier 5 and the gas flow space 9. The temperature difference is responsible for the driving force behind the self-convection, so that the driving force may be increased substantially through the arrangement of the heat-insulating layers 17. The increased velocity of the gases through the furnace chamber will result in an improved balancing of the temperature in the vertical direction. For example, if the temperature is about 1,150° C. above the lower shelf plane 7' of the load carrier 5, then the temperature at the upper end 16 may be less than 10 degrees lower. Additionally, the temperature drop from the upper end 16 to the lower end 18 of the space 9 could be approximately 30 degrees.

The hot gases will soften and treat the loads 6 due to the corresponding high pressure within the furnace chamber.

The invention is of course not in any way restricted to the preferred embodiment described above, but many possibilities to modifications thereof would be apparent to a man skilled in the art, without departing from the basic idea of the invention. For example, it would be possible to make the insulating layer continuous as one single piece.

The very heating arrangement could be designed in many other ways, but it is essential that it is arranged in the bottom region of the furnace chamber, although it would in principle be conceivable to arrange any small heating element, which has only a power being a fraction of the total power of the heating elements arranged in the bottom region, anywhere higher in the furnace chamber for any smaller regulation.

What is claimed is:

1. A device in a pressure vessel for hot isostatic pressing comprising a furnace chamber surrounded by a heat insulating member, a load carrier arranged in the chamber and having one or more shelf planes perforated for gas flow therethrough and adapted to carry loads to be pressed, and a heating arrangement arranged in the chamber and having heating elements for heating the gas present in the chamber, said load carrier having surrounding lateral walls and being arranged with a space between the load carrier and the insulating member for allowing a flow of gas therebetween from the top and downwardly around the carrier, at least the heating elements producing the main part of the heating of the heating arrangement being arranged in a bottom region of the chamber, wherein at least considerable portions of said lateral walls of the carrier are provided with layers having a good heat insulating capacity, so that the temperature difference between the inner side of said lateral walls and the space between the outside thereof and the insulation member is increased and by that a driving force for a self convection of said gases is obtained.

2. A device according to claim 1 wherein the heating elements of the heating arrangement are arranged in the bottom region of the chamber.

3. A device according to claim 1 or 2 wherein said heating elements are arranged under the lowermost shelf plane of the load carrier.

4. A device according to claim 1 wherein said layers having a good heat insulating capacity are arranged at least along surfaces of the lateral walls located externally of such volumes of the carrier which are designed to be able to receive loads.

5. A device according to claim 1 wherein said layers having a good heat insulating capacity extend over substantially the entire lateral walls of the carrier.

6. A device according to claim 1 wherein said layers having a good heat insulating capacity are one single continuous layer.

7. A device according to claim 1 wherein said layers having a good heat insulating capacity are arranged externally of and on lateral walls belonging to a framework of the carrier.

8. A device according to claim 1 wherein said lateral walls of the load carrier are in the bottom region arranged to extend substantially past and surround the heating elements of the heating arrangement for conducting gases flowing downwardly in said space from below and upwardly past the heating elements for heating thereof.

9. A device according to claim 1 wherein the heating arrangement has thin plates placed in the bottom region of the chamber concentrically inside each other with mutual spaces therebetween with a center axis directed upwardly and arranged to carry heating elements arranged thereon in the spaces therebetween, so that gas is allowed to flow between said plates past the heating elements.

10. A device according claim 9 wherein the heating elements are formed by electrically heated resistance wires.

* * * * *

UNITED STATES PATENT AND TRADEMARK OFFICE
CERTIFICATE OF CORRECTION

PATENT NO.    : 6,512,208 B1
DATED         : January 28, 2003
INVENTOR(S)   : Carl Bergman It is certified that error appears in the above-identified patent and that said Letters Patent is hereby corrected as shown below:

<u>Title page,</u>
Item [86], "July 10, 2001" should read -- July 10, 2000 --.
Item [57], ABSTRACT,
Line 2, "utilizing" should read -- comprises --.

Signed and Sealed this

Twenty-ninth Day of July, 2003

JAMES E. ROGAN
*Director of the United States Patent and Trademark Office*